Figure 3:
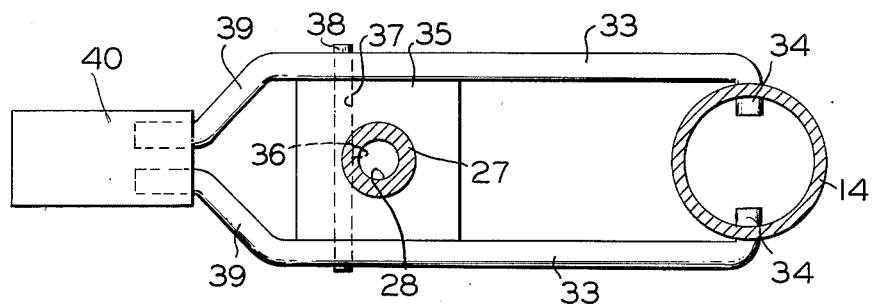

Nov. 10, 1953         F. TRIBBITT                2,658,648
          DISPENSING VALVE FOR DISPENSING MEASURED QUANTITIES
Filed March 19, 1952                         2 Sheets-Sheet 1
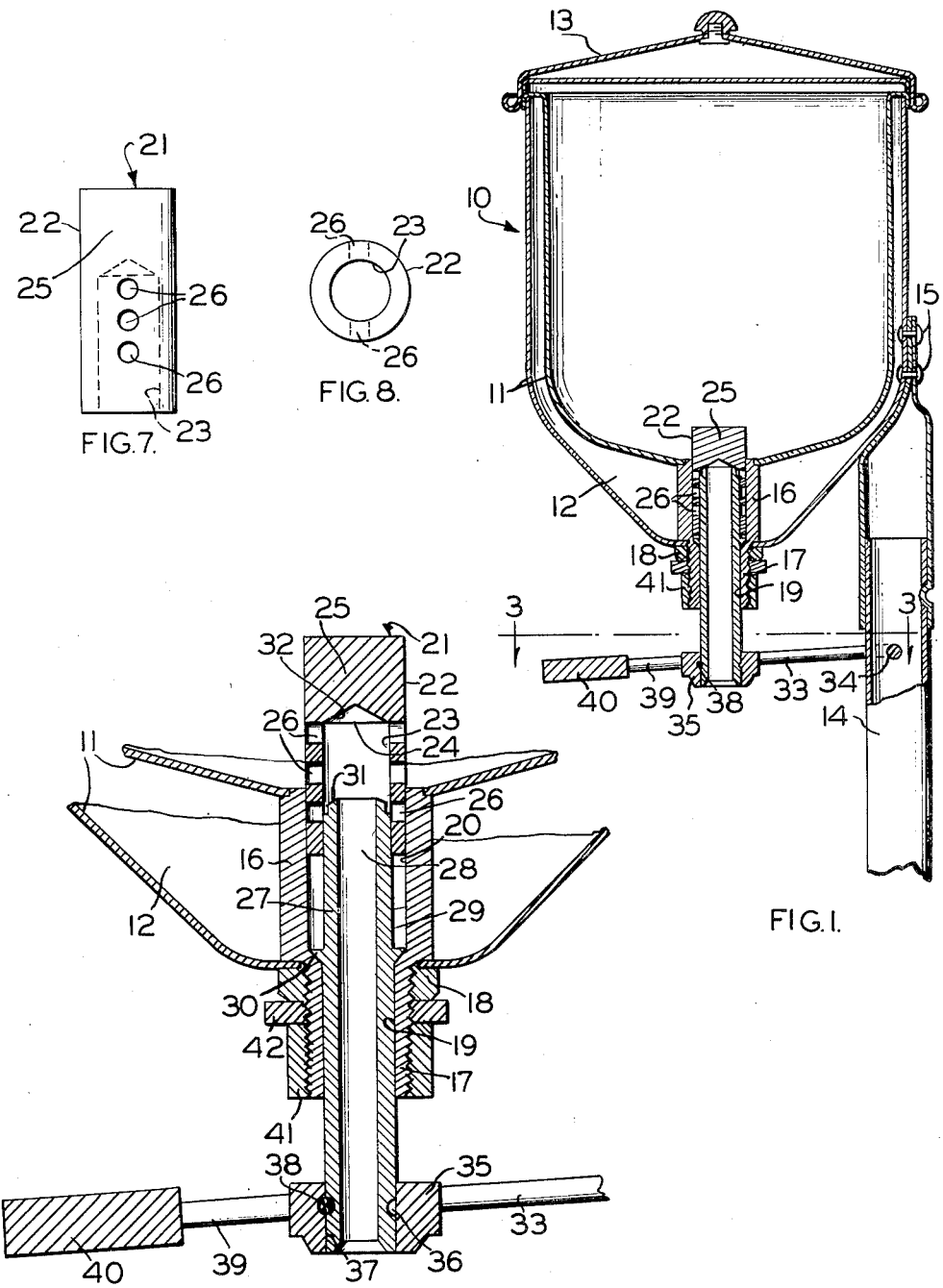
INVENTOR
FRANK TRIBBITT
BY Hilmond Q. Vogel
                ATT'Y Nov. 10, 1953 F. TRIBBITT 2,658,648
DISPENSING VALVE FOR DISPENSING MEASURED QUANTITIES
Filed March 19, 1952 2 Sheets-Sheet 2

INVENTOR
FRANK TRIBBITT
BY Helmuth O. Vogel
ATT'Y

Patented Nov. 10, 1953

2,658,648

UNITED STATES PATENT OFFICE 2,658,648

DISPENSING VALVE FOR DISPENSING MEASURED QUANTITIES

Frank Tribbitt, Chicago, Ill.

Application March 19, 1952, Serial No. 277,373

11 Claims. (Cl. 222—477)

This invention relates to a dispensing valve for dispensing measured quantities. More particularly this invention relates to an improved liquid dispensing valve of a type readily adaptable for use with dispensing containers such as cream dispensers.

In certain dispensers such as cream dispensers it is desired to dispense certain measured quantities, the quantity being the equivalent amount which is usually desired in a single cup of coffee. In the well known type of cream dispenser which is prevalent in many food establishments the person dispensing the cream merely holds the cup of coffee underneath the dispensing valve and pushes upwardly on a lever mechanism whereupon a predetermined quantity of cream is dispensed into the cup. Various types of cream dispensing valves have been utilized for cream dispensers but many of these have been unsatisfactory since they did not meet with the sanitation requirements to which devices of this type are subjected by local health boards and other organizations of similar nature. In order to be acceptable from the standpoint of sanitary codes a dispensing valve of this type must be such that it can quickly be disassembled for cleaning purposes and therefore the most desirable construction is a valve which contains few parts and can readily be removed from the dispenser for washing purposes. Spring type and float type of dispensing valves have been utilized but in most instances these valves functioned unsatisfactorily and were undesirable from a sanitation standpoint. A float valve in particular would not permit all of the cream within the dispensing container to be dispensed since the float operating on a floating principle could not effectively discharge the last layer of cream which was present at the bottom of the container. The disadvantage of this from a sanitary standpoint is quite obvious since in many instances the restaurant operator may disregard the layer of liquid which remains at the bottom of the container and simply pour a fresh quantity of cream into the dispensing unit. The unsanitary aspects of this process are thus self apparent. It is a prime object of this invention therefore to provide an improved dispensing valve for dispensers the valve having a simplified construction and being sanitary and efficient in operation.

And still another object of this invention is to provide an improved valve construction for dispensing containers the valve having provisions wherein the dispensing container can be completely emptied of liquid and the valve is constructed to permit measured quantities of liquid to be dispensed from the container. A still further object is to provide a dispensing valve for liquid dispensers the valve comprising a sleeve which is connected to the bottom of the dispensing container, the sleeve supporting for reciprocation a valve member which is provided with a longitudinally extending bore opening outwardly at the lower end of the valve member, the valve member also being slidingly engageable with a plunger and the relationship of the plunger and the valve member being such that liquid is dispensed through the valve member and through the plunger in measured quantities, the valve member being movable downwardly by gravity at a predetermined rate of descent as determined by the displacement of a quantity of liquid which is positioned within an annular recess below the valve member, the liquid being displaceable from the recess by the gradual descent of the valve member by gravity.

These and further objects will become more readily apparent from a reading of the specification when taken in connection with the accompanying sheets of drawings.

Figure 4:
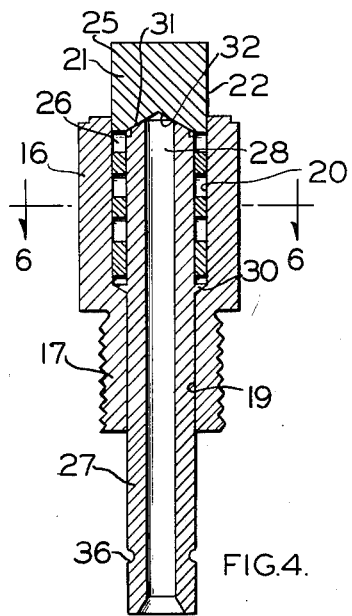
Figure 5:
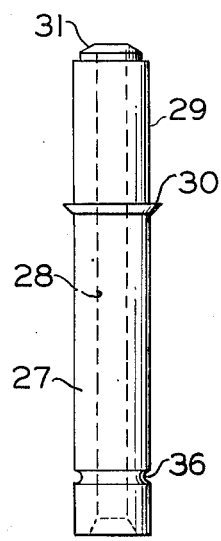
Figure 6:
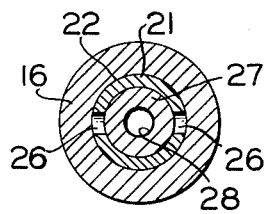

In the drawings:

Figure 1 is a cross sectional view through a dispensing container showing a dispensing valve embodying the features of the invention, Figure 2 is an enlarged sectional view through a dispensing valve, Figure 3 is a cross sectional view through a valve actuating lever mechanism the view being taken along the line 3—3 of Figure 1, Figure 4 is a detail view in cross section of a sleeve, a valve member and a plunger, forming major components of an improved valve mechanism, Figure 5 is an elevational view of a plunger showing a detail in the construction of a valve mechanism, Figure 6 is a cross sectional view through certain assembled parts of a valve mechanism, the view being taken along the lines 6—6 of Figure 4, Figure 7 is an elevational detail view of a valve member, and Figure 8 is a bottom view of the valve member shown in Figure 7.

Referring to the drawings a dispensing container is generally designated by the reference character 10. The dispensing container 10 as shown in this figure is a cream dispenser of the type which may ordinarily be found in food dispensing establishments. The dispenser 10 consists of a double wall construction 11 providing therebetween an insulating chamber 12. A conventional cover 13 is disposed on top of the dispenser 10. The dispensing container 10 is suitably supported on a support 14 the container 10 being rigidly held on the support by means of fastening members as indicated at 15.

Referring now to Figures 1, 2, 4 and 6, a sleeve is indicated at 16. The sleeve 16 is suitably anchored on the double wall construction 11, the said sleeve 16 having a threaded extension 17 in which a nut 18 is threaded. The nut 18 is tightly screwed against the outermost wall 11 to firmly anchor the sleeve 16 with respect to the dispensing container 10. The sleeve 16 is provided with a first or lower bore 19 which is in communication with an upper or second bore 20. A valve member 21 is reciprocally positioned within the sleeve 16 the valve member 21 also being particularly well shown in Figures 7 and 8. The valve member 21 is provided with an outer peripheral surface 22 and includes a longitudinally extending bore 23 which terminates within the valve member and which opens outwardly at the lower end of said valve member 21.

The bore 23 in effect provides a chamber 24. The valve member 21 is also provided at its upper end above the bore 23 with a weighted portion or section 25. A plurality of inlet openings 26 extend transversely in the valve member 21, the inlet openings 26 also being longitudinally spaced as best indicated in Figures 2 and 7.

A plunger 27 is positioned for reciprocation with respect to the valve member 21. The plunger 27 comprises an open end bore 28 having an outer upper peripheral surface 29 in sliding engagement with the bore 23 of the valve member 21. The plunger 27 is also provided with an annular projection 30 which effectively functions to seal the lower bore 19 from the upper bore 20 as will be further indicated in the operation.

The upper end of the plunger 27 is provided with an annular sealing surface 31 which is adapted to engage in sealing relation a conical valve seat 32 formed at the upper end of the bore 23 in the valve member 21.

A valve actuating lever is indicated at 33. The lever 33 is suitably pivoted as indicated at 34, and as particularly well shown in Figure 3, to the support 14. The lever 33 is of a bail or U-shaped type. A pivot block 35 is supported on the bail shaped lever 33. The lower end of the plunger 27 is provided with an annular recess 36. A bore 37 is provided in the pivot block 35. The lower end of the plunger 27 is fitted into the bore 37 and a pin 38 extends laterally through the pivot block 35, the pin pivotally engaging the recess 36 of the plunger 33, the said pin 38 being supported on the lever 33. Thus the pivot block 35 is pivotally supported with respect to the lever 33 and upon upward and downward movement of the lever 33 the plunger 27 may freely slide in the bore 19 of the threaded extension 17 of the sleeve 16. It must be realized of course that a preferred construction has been shown with respect to the pivotal connection of the lever 33 with respect to the pivot block 35. Other means for connecting the plunger 27 in pivotal relation with respect to the lever 33 may be had without in any way changing the effective aspects of the invention. The lever 33 includes converging legs 39 which are suitably connected to a weight 40. The weight 40 also acts as an engaging surface or handle which the operator may grasp for actuating the lever 33 upwardly. Nuts 41 and 42 are also threaded on the threaded extension 17. By unscrewing the nut 41 in a direction downwardly it can be seen that the effective stroke distance of the plunger can be varied since the pivot block 35 is limited in its upward movement by means of the nut 41. The nut 42 can be considered a jamnut for the purpose of securely locking the nut 41 in position.

The stages of operation are best shown in Figures 1, 2 and 4. When it is desired to dispense a quantity of cream from the dispensing container 10 the operator merely grasps or pushes the weighted end of the lever 33 and moves it upwardly whereupon the plunger 27 is effective to move the valve member 21 upwardly to or beyond the position shown in Figure 2. In the position shown in Figure 2 the valve member 21 has been pushed upwardly so that certain of the inlet openings 26 are in direct communication with the interior of the dispensing container 10 whereby cream will enter into the inlet openings 26 and into the chamber 24. Immediately after the valve member 21 has been pushed upwardly and released a plurality of functions take place. Since the lever 33 is weighted by means of the weight 40 the plunger 27 immediately descends to its downward position whereupon the annular projection 30, as indicated in the position shown in Figure 2 effectively seals the bore 19 from the annular space formed beneath the valve member 21. The plunger 27 thus is now in its original position. Simultaneously with the upward movement of the valve member 21, cream is drawn into the annular space below the valve member 21. This annular space is provided by the inner surface of the bore 20 and by the outer peripheral surface 29 formed at the upper end of the plunger 27. The outer peripheral surface 22 of the valve member 21 is of sufficiently less diameter with respect to the bore 20 of the sleeve 16 so that upon the upper displacement or movement of the valve member 21 cream will enter immediately into the annular space which is disposed below the valve member 21. The differences in diameter between the outer surface 22 and the bore 20 are not very great but the differences are sufficient so that upon the upward movement of the plunger 21 a certain suction is created beneath the plunger to effectively draw the cream from the dispenser into the annular space beneath said valve member.

The valve member 21 now being in its upper position as indicated in Figure 2, liquid which flows into the chamber 24 is immediately discharged through the open end bore 28 to a desired container not shown which may be held beneath the plunger 27.

Since the valve member 21 is sufficiently weighted it will immediately tend and descend, due to gravity, against the hydraulic force of the liquid within the annular space. As the valve member 21 descends the liquid within the annular space is displaced back into the dispensing container 10 and as the openings 26 are moved downwardly beyond the upper end of the sleeve 16 lesser amounts of liquid of course can enter into the chamber 24 until the openings 26 are completely below the upper end of the sleeve 16 whereupon the liquid flow from the container completely ceases. The valve membr 21 then is returned to its original position and the desired measured quantity of cream has been discharged. As best shown in Figure 4 the sealing surface 31 is in sealing relation with respect to the conical valve seat 32 and this additionally serves to keep the cream from leaking into the bore 28. Since the upper end of the bore 28 is also thus tightly sealed it will effectively keep the lower end of the plunger 27 from discharging droplets of cream which might be retained within the bore 28.

As indicated previously the upward stroke of the plunger 27 can be increased or decreased by adjusting the nut 41 with respect to the pivot block 35. Thus if the plunger 27 is so adjusted that it will move the valve member 21 upwardly to expose all of the openings a greater liquid flow is possible. On the other hand the adjustment may be such that only the uppermost of the inlet openings may be displaced during the stroke of the plunger to the position where they are in communication with the interior of the dispensing container 10, and thus a lesser amount of liquid is dispensed.

It can thus be seen that an improved valve mechanism for dispensing containers has been shown and described. The dispensing valve is effective in operation and consists of a minimum number of parts which can readily be disassembled for cleaning. By merely removing the valve member 21 and the plunger 27 the unit can be quickly cleaned. The objects of the invention have thus been fully achieved and it must be understood that changes and modifications may be made which do not depart from the spirit of the invention as disclosed nor the scope thereof as defined in the appended claims.

What is claimed is:

1. A valve for a dispensing container comprising a sleeve adapted to be stationarily connected to the container, said sleeve having an inner peripheral surface, a valve member positioned for reciprocation within said sleeve, said valve member having an outer peripheral surface in relative sliding engagement with the surface of said sleeve, a longitudinally extending bore formed in said valve member, said bore being closed at one end to form an inlet chamber, a valve seat formed in said valve member adjacent the closed end of said bore, said valve member having a plurality of longitudinally spaced transversely extending openings adapted to provide for the inlet of liquid to said inlet chamber, a weight on said valve member for continuously urging said valve member in a downward direction within said sleeve, a plunger movably positioned within said bore, said plunger having a longitudinally extending bore adapted to receive liquid from the chamber at one end and to discharge the liquid at its other end, a sealing surface at one end of said plunger engageable with the valve seat for sealing said inlet openings with respect to said bore in said plunger, means for moving said plunger and said valve member upwardly into a position wherein said inlet openings are above said sleeve to provide communication between the dispensing container and said inlet openings, said plunger being movable by gravity relative to said valve member to move said sealing surface from sealing contact with said valve seat whereupon the inlet openings are in communication with said bore in said plunger the outer surface of said valve member being sufficiently laterally spaced from the inner surface of said sleeve to provide for the inflow of liquid into an annular space formed by the inner peripheral surface of the sleeve and the outer peripheral surface of the plunger below the valve member, said valve member being movable under gravity downwardly to displace the liquid within the annular space, and to assume its original position whereby said inlet openings are closed by the plunger.

2. A valve for a dispensing container comprising a sleeve adapted to be stationarily connected to the container, said sleeve having an inner peripheral surface, a valve member positioned for reciprocation within said sleeve, said valve member having an outer peripheral surface in relative sliding engagement with the surface of said sleeve, a longitudinally extending bore formed in said valve member, said bore being closed at one end to form an inlet chamber, a valve seat formed in said valve member adjacent the closed end of said bore, said valve member having a plurality of longitudinally spaced transversely extending openings adapted to provide for the inlet of liquid to said inlet chamber, a plunger movably positioned within said bore, said plunger having a longitudinally extending bore adapted to receive liquid from the chamber at one end and to discharge the liquid at its other end, a sealing surface at one end of said plunger engageable with the valve seat for sealing said inlet openings with respect to said bore in said plunger, means for moving said plunger and said valve member upwardly into a position wherein said inlet openings are above said sleeve to provide communication between the dispensing container and said inlet openings, said plunger being movable by gravity relative to said valve member to move said sealing surface from sealing contact with said valve seat whereupon the inlet openings are in communication with said bore in said plunger, portions of the outer surface of said valve member being sufficiently spaced laterally from the inner surface of said sleeve to provide for the inflow of liquid into an annular space formed by the inner peripheral surface of the sleeve and the outer peripheral surface of the plunger below the valve member, said valve member being movable under gravity downwardly to displace the liquid within the annular space, and to assume its original position whereby said inlet openings are closed by the plunger.

3. A valve for a dispensing container comprising a sleeve adapted to be stationarily connected to the container, said sleeve having an inner peripheral surface, a valve member positioned for reciprocation within said sleeve, said valve member having an outer peripheral surface in relative sliding engagement with the surface of said sleeve, a longitudinally extending bore formed in said valve member, said bore being closed at one end to form an inlet chamber, a valve seat formed in said valve member adjacent the closed end of said bore, said valve member having a plurality openings adapted to provide for the inlet of liquid to said inlet chamber, a plunger movably positioned within said bore, said plunger having a longitudinally extending bore adapted to receive liquid from the chamber at one end and to discharge the liquid at its other end, a sealing surface at one end of said plunger engageable with the valve seat for sealing said inlet openings with respect to said bore in said plunger, means for moving said plunger and said valve member upwardly into a position wherein said inlet openings are above said sleeve to provide communication between the dispensing container and said inlet openings, said plunger being movable by gravity relative to said valve member to move said sealing surface from sealing contact with said valve seat whereupon inlet openings are in communication with said bore in said plunger the outer surface of said valve member being sufficiently laterally spaced from the inner surface of said sleeve to provide for the inflow of liquid into an annular space formed by the inner peripheral surface of the sleeve and the outer peripheral surface of the plunger below the valve member, said valve member being movable under gravity downwardly to displace the liquid within the annular space, and to assume its original position whereby said inlet openings are closed by the plunger.

4. A valve for a dispensing container comprising a sleeve adapted to be stationarily connected to the container, said sleeve having an inner peripheral surface, a valve member positioned for reciprocation within said sleeve, said valve member having an outer peripheral surface in relative sliding engagement with the inner surface of said sleeve, a longitudinally extending bore formed in said valve member, said bore terminating in a closed end within said valve member, said valve member having a plurality of inlet openings in communication with said bore, a plunger movably positioned in said bore, said plunger having a longitudinally extending bore adapted to receive liquid from the openings and discharge the liquid therefrom, said plunger being movable in the bore of said sleeve to cover and seal said openings in one position and to open said openings in a second position, means for moving said plunger and said valve member upwardly into a position wherein said inlet openings are above said sleeve to communicate with the interior of a container, said plunger being movably downwardy to expose said openings wherein liquid flows into the bore of said sleeve and through the bore of the plunger, the outer surface of said valve member being laterally spaced from the inner surface of the sleeve to provide for inflow of liquid, on the upward stroke of the sleeve, into an annular space formed by the inner peripheral surface of the sleeve and the outer peripheral surface of the plunger below said valve member, said valve member being movable downwardly to displace the liquid within the annular space and to assume its original position with the inlet openings blocked by said plunger.

5. A valve for a dispensing container in accordance with claim 4, said means for moving said plunger and the valve member upwardly including a lever pivotally connected to said plunger.

6. A valve for a dispensing container in accordance with claim 5, said lever including a weight adapted to urge the plunger downwardly into its original position.

7. A valve for a dispensing container in accordance with claim 6, including a second weight on said valve member for urging the same in a downward direction with respect to said sleeve.

8. In a dispensing container, a dispensing valve comprising a sleeve connected to the bottom of said container, a valve member positioned for reciprocation within said sleeve, said valve member having a longitudinally extending bore opening outwardly at the lower end of said valve member, said valve member having at least one laterally extending inlet opening communicating with the bore and being normally closed from the container by the inner surface of the sleeve, a plunger movably positioned within the bore of the valve member, said plunger having a second longitudinally extending bore open at its lower end and having its upper end normally closed by engagement with the valve member, means for moving said plunger upwardly whereby said valve member is moved upwardly into a position wherein said opening in said valve member is in direct communication with the interior of said container, said plunger being movable downwardly to provide for communication between the first and second bores and said inlet opening for the discharge of liquid, said valve member being arranged with respect to said sleeve to draw liquid into an annular space formed below the valve member by said plunger and said sleeve, said valve member being movable by gravity downwardly against the liquid in said annular space to displace the same and to assume its original position upon the displacement of said liquid whereupon the discharge of liquid ceases.

9. In a dispensing container in accordance with claim 8 including adjustable means for limiting the upward movement of said valve member.

10. In a dispensing container in accordance with claim 8, said means for moving said plunger including a lever arm pivotally connected to said plunger, the lever arm being movable by gravity to return the plunger to its downward position.

11. In a dispensing container, a dispensing valve comprising a sleeve connected to the bottom of said container, a valve member positioned for reciprocation within said sleeve, said valve member having a longitudinally extending bore opening outwardly at the lower end of said valve member, said valve member having at least one laterally extending inlet opening communicating with the bore and being normally closed from the container by the inner surface of the sleeve, a plunger movably positioned within the bore of the valve member, said plunger having a second longitudinally extending bore open at its lower end, means for moving said plunger upwardly whereby said valve member is moved upwardly into a position wherein said opening in said valve member is in direct communication with the interior of said container, said plunger being movable downwardly to provide for communication between the first and second bores and said inlet opening for the discharge of liquid, said valve member being arranged with respect to said sleeve to draw liquid into an annular space formed below the valve member by said plunger and said sleeve, said valve member being movable by gravity downwardly against the liquid in said annular space to displace the same and to assume its original position upon the displacement of said liquid whereupon the discharge of liquid ceases.

FRANK TRIBBITT.

References Cited in the file of this patent

UNITED STATES PATENTS

| Number | Name | Date |
| --- | --- | --- |
| 923,611 | Werd | June 1, 1909 |

FOREIGN PATENTS

| Number | Country | Date |
| --- | --- | --- |
| 1,589 | Great Britain | Apr. 20, 1878 |
| 33,762 | Norway | Jan. 2, 1922 |
| 59,798 | Germany | May 1, 1891 |